United States Patent
Marinkovich et al.

(10) Patent No.: US 8,490,012 B2
(45) Date of Patent: *Jul. 16, 2013

(54) COLLABORATIVE MEDIA PRODUCTION

(75) Inventors: Mike Marinkovich, Santa Clara, CA (US); Gregory Charles Lindley, Sunnyvale, CA (US); Alan Cannistraro, San Francisco, CA (US); Evan Doll, San Francisco, CA (US); Gary Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,664

(22) Filed: Jul. 16, 2012

(65) Prior Publication Data

US 2012/0278731 A1   Nov. 1, 2012

Related U.S. Application Data

(63) Continuation of application No. 12/171,152, filed on Jul. 10, 2008, now Pat. No. 8,225,228.

(51) Int. Cl.
*G06F 13/00* (2006.01)
*G06F 15/00* (2006.01)

(52) U.S. Cl.
USPC .......................................... 715/793; 715/751

(58) Field of Classification Search
USPC ................. 715/751, 716, 784–786, 790–794, 715/840, 848–853
See application file for complete search history.

(56) References Cited

U.S. PATENT DOCUMENTS

| | | | |
|---|---|---|---|
| 6,321,252 B1 | 11/2001 | Bhola et al. | |
| 7,257,774 B2 | 8/2007 | Denoue et al. | |
| 7,596,598 B2 | 9/2009 | Birch | |
| 7,640,506 B2 | 12/2009 | Pratley et al. | |
| 7,734,690 B2 * | 6/2010 | Moromisato et al. | 709/204 |
| 7,810,037 B1 | 10/2010 | Edwards et al. | |
| 7,827,239 B2 | 11/2010 | Bodin et al. | |
| 7,831,906 B2 | 11/2010 | Bodin et al. | |
| 7,958,453 B1 | 6/2011 | Taing | |
| 8,225,228 B2 | 7/2012 | Marinkovich et al. | |
| 2005/0097440 A1 | 5/2005 | Lusk et al. | |
| 2005/0138566 A1 * | 6/2005 | Muller et al. | 715/759 |
| 2006/0117264 A1 | 6/2006 | Beaton et al. | |
| 2008/0304747 A1 * | 12/2008 | Marinkovich et al. | 382/183 |
| 2008/0304807 A1 | 12/2008 | Johnson et al. | |
| 2009/0024963 A1 | 1/2009 | Lindley et al. | |
| 2009/0138808 A1 | 5/2009 | Moromisato et al. | |

OTHER PUBLICATIONS

Windows Media Player 9 for Windows XP, Microsoft Corp. 2002, Screen Shots 1-14.
U.S. Non-Final Office Action for U.S. Appl. No. 12/171,152 dated Sep. 2, 2011, 17 pages.
U.S. Notice of Allowance for U.S. Appl. No. 12/171,152 dated Sep. 2, 2011, 7 pages.

* cited by examiner

*Primary Examiner* — Cao "Kevin" Nguyen
(74) *Attorney, Agent, or Firm* — Schwegman Lundberg & Woessner, P.A.

(57) ABSTRACT

Methods, systems, and apparatus for collaborative media editing. In one aspect, a method includes presenting, to an originator, an originator interface including multiple media panes; establishing a connection with a collaborator; receiving from the originator a selection indicating an item of media content associated with at least one of the multiple media panes; transmitting to the collaborator the selected item of media content; and enabling inter-user communication relating to the selected item of media content in the originator interface with the collaborator. Further, a connection can be established with a second collaborator, the item of media content can be transmitted to the second collaborator, and communication can occur in the originator interface with the second collaborator.

39 Claims, 6 Drawing Sheets

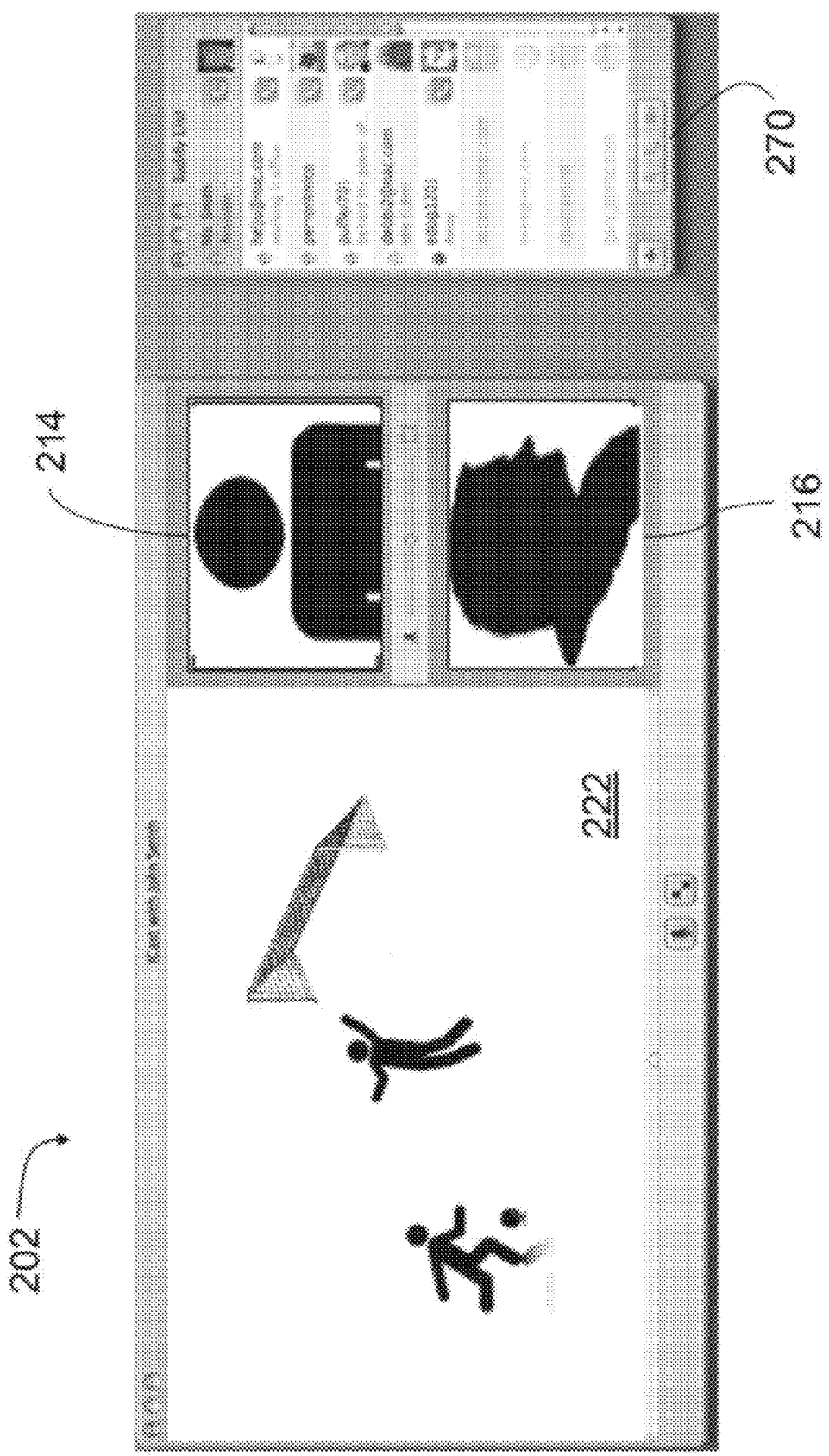

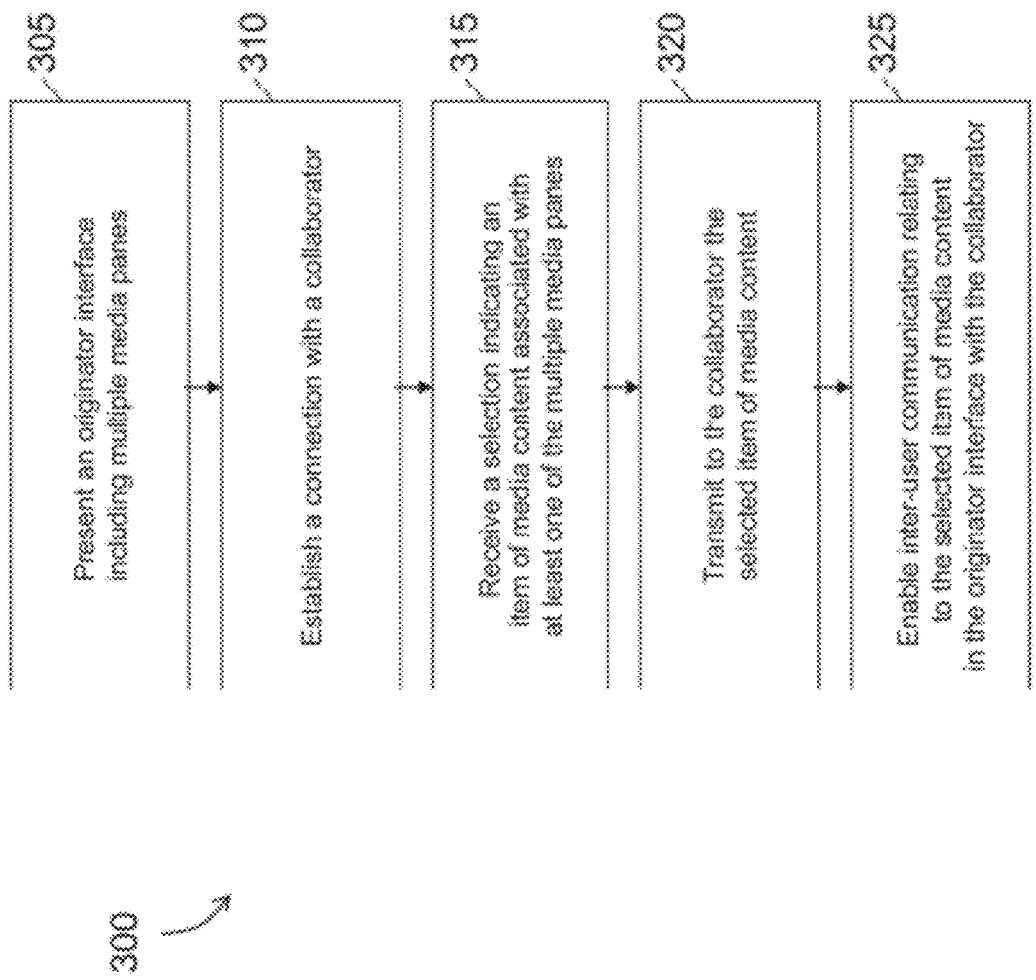

COLLABORATIVE MEDIA PRODUCTION

CROSS-REFERENCE TO RELATED APPLICATION

This application is a continuation (and claims the benefit of priority under 35 USC 120) of U.S. application Ser. No. 12/171,152, filed Jul. 10, 2008, and titled "Collaborative Media Production," which is incorporated by reference.

TECHNICAL FIELD

The present disclosure relates to a system for collaborative media editing in a networked environment.

BACKGROUND

Modern video editing methods include non-linear video editing, which involves accessing and splicing frames in video segments. Non-linear video editing can be performed on one or more computer-based systems using video editing software. A variety of video editing software applications have been developed, such as Final Cut Pro®, Final Cut Express®, and iMovie® HD 6.0.1, provided by Apple, Inc. (Cupertino, Calif.), which provide users with the ability to apply non-linear editing techniques in order to edit raw footage. Such software enables a user to edit video clips. Further, non-linear editing can include cutting segments of the footage, re-arranging segments of the same video clip, re-arranging and combining segments of multiple video clips, or adding content such as audio tracks, voice-overs, titles, and transitions between frames. Additionally, the resulting edited video can be distributed to viewers in a variety of media formats, such as DVD, CD-ROM, videotape, downloadable file, or web streaming.

SUMMARY

This specification describes technologies relating to collaboration on media production. In one example, one or more media projects are produced through the collaborative efforts of at least one originator (or "the originator") and one or more collaborators (or "the collaborator"). A collaboration environment can be created such that the originator can communicate in real-time with the collaborator over a communication network. Further, the originator can communicate through an originator interface provided by a collaborative software application installed, e.g., on the originator's computer system. At least one item of media content associated with the media project can be shared with the collaborator over the communication network. In addition, one or more source files associated with the media project can be identified by the collaborative software application and shared with the collaborator. Depending on an assigned privilege level, the collaborator can review, provide feedback, edit and/or otherwise manipulate the media project.

In one aspect a computer-implemented method for collaborative media editing includes presenting, to an originator, an originator interface including multiple media panes. A connection with a collaborator is established. A selection indicating an item of media content associated with at least one of the multiple media panes is received from the originator. The selected item of media content is transmitted to the collaborator. Inter-user communication relating to the selected item of media content in the originator interface with the collaborator is enabled.

This and other aspects can include one or more of the following features. One or more source files associated with the item of media content that are not stored at the collaborator can be identified. The one or more source files can be transmitted to the collaborator. Transmitting the one or more source files can be performed automatically upon identifying the one or more source files. The selected item of media content can be presented in a collaborator interface including at least one media pane. A privilege level for manipulating the item of media content can be assigned to the collaborator. The inter-user communication can be performed in real-time. A connection with a second collaborator can be established. The selected item of media content can be transmitted to the second collaborator. Inter-user communication relating to the selected item of media content in the originator interface with the second collaborator can be enabled. The item of media content can be revised to generate a revised item of media content. A message to a notification service identifying the revised item of media content can be transmitted. Transmitting to the collaborator the selected item of media content can include transmitting a copy of the selected item of media content.

Particular implementations of the subject matter described in this specification can be implemented to realize one or more of the following potential advantages. For example, multiple remote users can simultaneously collaborate on a media project in real-time over a communication network. In addition, multiple remote users can collaborate on a media project asynchronously over a communication network. Moreover, an originator can assign varying privilege levels to a collaborator for collaborating on the media project. For example, depending on the assigned privilege level, the collaborator can review, provide feedback, edit and/or otherwise manipulate various portions of the media project. Additionally, multiple items of media content can be presented, or displayed, in multiple media panes of an originator interface, which can be provided by a collaborative software application. Further, the collaborative software application can enable the originator to selectively share items of media content with the collaborator. For example, the originator can select to share a media project script (or "storyboard") of the media project with the collaborator. In addition, the originator interface can be configured to integrate remote communication with collaborative media manipulation.

Similarly, the multiple items of media content can be presented in at least one media pane of a collaborator interface. The collaborator interface also can be configured to integrate remote communication with collaborative media manipulation. Moreover, one or more source files of the media project associated with the originator's system can be identified by the collaborative software application and shared with the collaborator. For example, the source files can include video clips, audio clips, transitions, text or titles. Sharing the one or more source files with the collaborator can ensure that the collaborator has access to all the files comprising the media project. Additionally, the source files can be automatically shared upon establishing a connection with the collaborator. For example, the source files can be synched and transferred automatically upon the collaborative software application establishing the connection between the originator and the collaborator.

In addition, the media project can be stored on the originator's local computer system in which the collaborative software application is installed and shared over the communication network with at least the collaborator. Alternatively, the media project can be stored on a remote server such that it is accessible to the originator and one or more collaborators.

For example, the media project can be stored on a shared computing system such that the collaborating users can access the media project simultaneously without requiring the items of media content to be shared in a live datastream. Further, the collaborator can receive a notification from the originator notifying the collaborator that the media project is available. For example, a publish/subscribe communication model can be used to notify the collaborator whenever an update to a subscribed media project is available. Alternatively, updates to a media project can be provided using an RSS feed. Similarly, the originator can receive a notification from the collaborator indicating that a particular media project has been accessed, reviewed, edited, or otherwise manipulated.

Moreover, collaboration on the media project can be performed even when the collaborator does not have access to the collaborative software application used by the originator. For example, the collaborator can collaborate with the originator through a chat application installed, e.g., on the collaborator's computer system. In addition, pre-edited and post-edited versions of the media project can be accessed by the originator and the collaborator. Further, changes to the media project can be emphasized. For example, the media project can be presented such that changes are highlighted, colored, projected larger, outlined or otherwise enhanced. Additionally, the collaborative software application can notify users of editing conflicts and facilitate resolving such conflicts. For example, if the collaborating users make disparate edits to the same portion of the media project, the collaborative software application can notify the collaborating users of the editing conflict. In addition, collaboration can occur dynamically in real-time without requiring the media project to first be recorded on a writable medium.

Details of one or more implementations are set forth in the accompanying drawings and the description below. Other aspects can be implemented in systems and computer program products, encoded on a computer-readable medium, operable to cause data processing apparatus to perform such operations. Other features, aspects, and advantages will become apparent from the description, the drawings, and the claims.

BRIEF DESCRIPTION OF THE DRAWINGS

FIGS. 2A, 2B and 2C show exemplary media collaboration interfaces.

FIG. 3 shows a flowchart of an exemplary process for collaborating on a media project.

Like reference numbers and designations in the various drawings indicate like elements.

DETAILED DESCRIPTION

Figure 1:
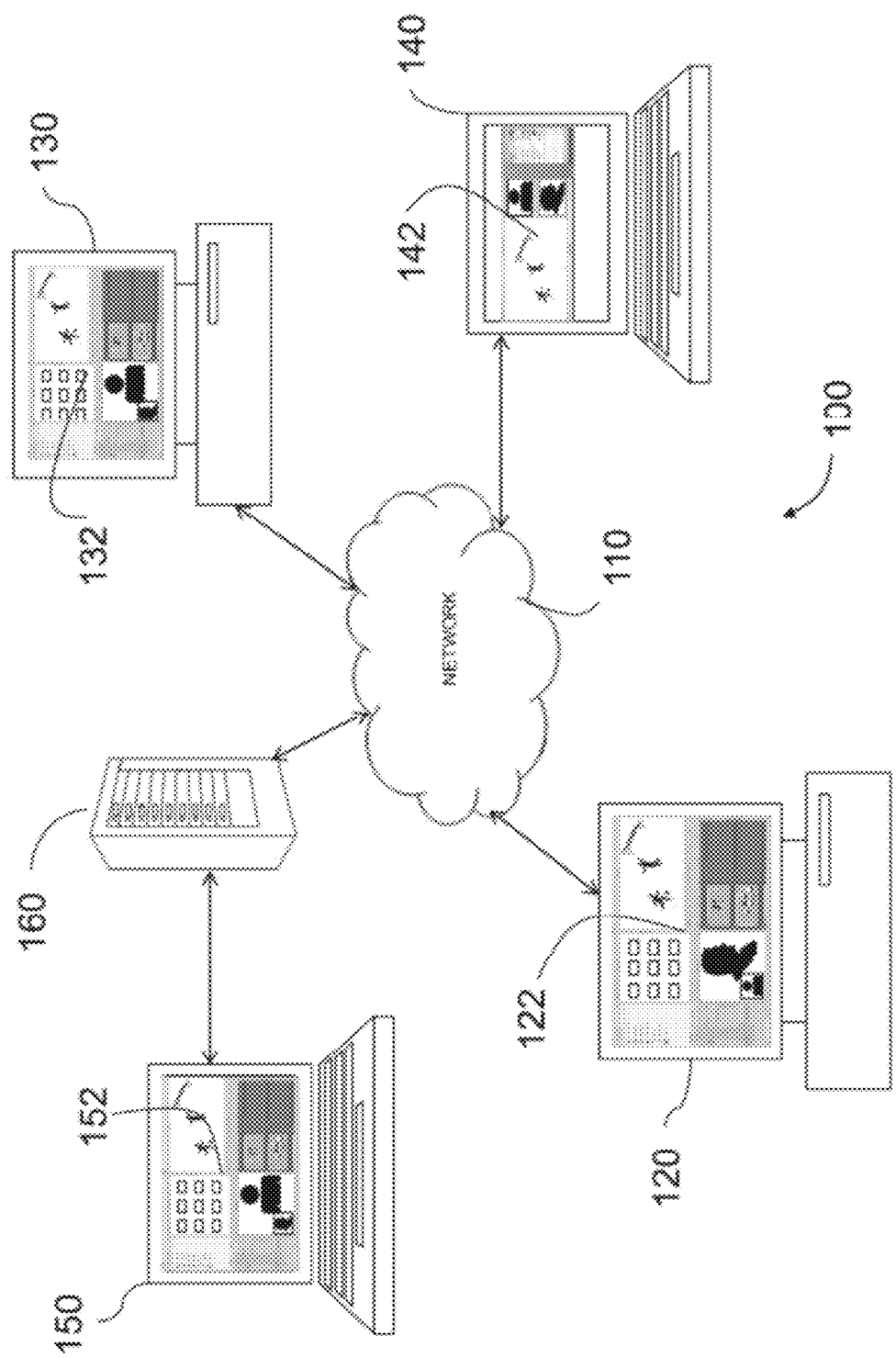
FIG. 1 shows an exemplary communication system for enabling media collaboration.

FIG. 1 shows an exemplary communication system 100 for enabling media collaboration. The communication system 100 includes a network 110. The network 110 can be any communication network, such as a public communication network, e.g., the Internet, a private communication network, such as a local area network, or a combination of public and private networks. The network 110 enables multiform communications between remote network participants. The network participants can collaborate to produce a media project.

Such collaboration can include: reviewing a media project; providing feedback relating to a media project; editing a media project; processing a media project; or otherwise manipulating a media project. The media project can include media content, such as, video clips, audio clips, transitions, text, titles or other such media content. For example, the video clips can be entire video segments or portions of video segments saved in a storage device operatively coupled to a computer system on which a collaborative software application is installed. The network participants can include an originator and one or more collaborators, each operating a computer system connected to the network 110. For example, as shown in FIG. 1, an originator computer 120 can be connected to one or more collaborator computers 130, 140, and 150 through the network 110. In some implementations, the originator can be a creator of the media project. In other implementations, the originator can be an editor, a distributor, a producer, a director, an owner, or otherwise be responsible for the media project. In some implementations, the originator can retain editorial control of the media project.

The originator can collaborate with the collaborator on the media project. Such collaboration includes reviewing, providing feedback, editing or otherwise manipulating the media project. Hence, in some implementations, the collaborator can be an editor of the media project. In other implementations, the collaborator can be a reviewer, a commentator, or a manipulator of the media project. In some implementations, the collaborator can be more than one collaborator. In such implementations, the originator can collaborate on the media project with the one or more collaborators over the network 110. Additionally, the one or more collaborators can be permitted to collaborate with one another over the network 110.

The media project can be presented, or displayed, in an originator interface 122 generated by the collaborative software application installed, e.g., on the originator's computer system. Such an implementation is shown as the originator computer 120 in FIG. 1. The originator can present, edit, process or otherwise manipulate the media project in the originator interface 122. The originator interface 122 can include one or more media panes. In some implementations, an item of media content can be presented in each of multiple media panes. Further, the media project can be presented in a single media pane or in multiple media panes.

In some implementations, the media project can be presented in a collaborator interface 132 provided by a collaborative software application installed, e.g., on the collaborator's computer system. Such an implementation is shown as the collaborator computer 130 in FIG. 1. In some implementations, the collaborator can present, edit, process or otherwise manipulate the media project in the collaborator interface 132. The collaborator interface 132 also can include one or more media panes. Further, the media project can be played in the collaborator interface 132. In some implementations, the media project can be played in the originator interface 122 and the collaborator interface 132 simultaneously. Additionally, the collaborative software application installed on the collaborator computer 130 can be configured to perform operations similar to those performed by the collaborative software application installed on the originator computer 120.

The media project also can be presented in a limited collaborator interface associated with a chat application installed, e.g., on a collaborator's computer system. The chat application can be configured to include text, audio and/or video chat. Such an implementation is shown with respect to the collaborator computer 140 in FIG. 1. The media project also can be presented in a limited collaborator interface 142 associated with a communication application installed, e.g., on a collaborator's computer system. The limited collaborator interface 142 can permit the collaborator to review the media project and collaborate with the originator and one or more other collaborators, but not edit, process or otherwise manipulate the media project.

For example, the limited collaborator interface 142 can be associated with a messaging program such as iChat®, provided by Apple, Inc. (Cupertino, Calif.), installed on the collaborator computer 140. The messaging program can be configured to permit the exchange of text, audio, and/or video messages with one or more other parties. In such an implementation, the collaborator using the collaborator computer 140 can present the media project in the limited collaborator interface 142. Additionally, the collaborator using the collaborator computer 140 can provide feedback about the media project through a communication channel provided by the associated messaging program. Further, the limited collaborator interface 142 includes at least one media pane, in which the media project can be presented.

In some implementations, the originator can establish a connection with one or more collaborators over the network 110. The originator and the one or more collaborators can be separated from one another by any distance. The connection over the network 110 can link the originator computer 120 with each participating collaborator computer, such as the collaborator computer 140. Once the connection between the originator and the one or more collaborators has been established, the connected parties can collaborate on the media project.

The originator computer 120 also can establish a connection through the network 110 to a server 160. The server 160 can be a multi-user computer system that provides a service and/or resources over the network 110 to a connected computer. As shown in FIG. 1, a collaborator, as well as the originator, also can be directly connected to the server 160, such as the collaborator computer 150. Further, the collaborator computer 150 can be connected to the network 110 through the server 160, and thus also can have a connection to the originator computer 120. In the exemplary implementation shown in FIG. 1, the collaborative software application can be installed on the collaborator computer 150 and can be configured to perform operations similar to those performed by the originator computer 120. Alternatively, the chat application can be installed on the collaborator computer 150, and can provide for limited collaboration Additionally, in some implementations, the media project can be stored on a storage device operatively coupled to the originator computer 120. In other implementations, the media project can be stored remotely from the originator computer 120, such as on a storage device operatively coupled to the server 160.

The server 160 also can be configured as a messaging system. The server 160 can receive a message from the originator and can transmit the message to one or more collaborators, and vice versa. For example, the server 160 can receive a message from the originator computer 120 stating that the media project is available for review, and can then transmit the message to one or more collaborators, such as the collaborator computer 150. In some implementations, upon receipt of the message, the collaborator can access the media project stored at the originator computer 120. In other implementations, upon receipt of the message, the collaborator can access the media project stored at the server 160.

The server 160 also can be configured using a publish/subscribe model. A message published by the originator can be disseminated by the server 160 to one or more collaborators who have subscribed to receive such messages. For example, the originator can produce a new version of the media project and can notify the server 160. In response, the server 160 can send a notification message to each subscribing collaborator to indicate that a new version of the media project is available. Thus, a collaborator can access the new version of the media project independently without having to connect with the originator in real-time. In some implementations, a collaborator can revise the media project and can notify the server 160 that a revision to the media project is available. The server 160 can then send a notification message to each subscriber, including the originator.

The originator also can select one or more items of media content to share with one or more collaborators over the network 110. Further, the collaborative software application installed on the collaborator computer, such as the collaborator computer 130, can receive and present the one or more items of media content in the collaborator interface 132. The one or more items of media content also can be received and presented in the limited collaborator interface 142. Further, the originator can share an accessible item of media content no matter where the item is stored.

The originator interface and the collaborator interface can include a communication pane configured to transmit video, audio and/or text between the originator and one or more collaborators. Thus, the originator and one or more collaborators can exchange real-time, or near real-time, communication regarding the media project. For example, a collaborator can provide real-time feedback about a media project being simultaneously reviewed by the collaborator and the originator.

The collaborative software application installed on the originator computer 120 can identify one or more source files associated with an item of media content that are not stored at a collaborator's computer, such as collaborator computer 130. Source files can include video clips, audio clips or text, which can comprise the media project, and can be transmitted to the collaborator over the network 110. The collaborator can edit, process or otherwise manipulate the received source files without altering the original source files.

The collaborative software application installed on the originator computer 120 can transmit the one or more source files automatically upon identifying the one or more source files associated with the item of media content. For example, upon establishing the connection with the collaborator, the collaborative software application installed on the originator computer 120 can identify and transmit one or more source files comprising the media project that are not stored on the collaborator computer 130. Transmission of the one or more source files can occur in the background of the collaborative software application. For example, the media project can be shared between the originator and the collaborator in the foreground of each respective interface, and one or more source files can be synched in the background. Additionally, files other than the one or more source files can be transmitted with the collaborator. For example, video files stored in a library of the storage device operatively coupled to the originator computer 120 but not active in the current media project can be shared with the collaborator over the network 110.

The originator can assign various privilege levels to the one or more collaborators collaborating on the media project. For example, the originator can assign a collaborator a "view-only" privilege level, therefore preventing the collaborator from editing, processing or otherwise manipulating the media project—the collaborator can merely present, review and play the media project in addition to providing feedback. Alternatively, the originator can assign a collaborator an "editor" privilege level thereby enabling the collaborator to edit, process, or otherwise manipulate portions of, or the entire media project. Moreover, the originator can assign a collaborator an intermediate privilege level which enables the collaborator to edit, process, or otherwise manipulate designated portions of the media project. For example, the collaborator can have permission to change transitions or titles, but no permission to edit, process, or otherwise manipulate other designated portions.

In some implementations, the collaborator can edit the media project by cutting source files, re-arranging source files, re-arranging and combining segments of multiple source files, and/or adding source files such as audio clips, voice-overs, titles, and transitions between frames. The collaborator also can add files other than the one or more source files already associated with the media project. For example, the collaborator can include in the media project files that are saved in a storage device operatively coupled to the collaborator computer 130. Further, the collaborator can edit the media project while communicating with the originator in real-time. For example, the originator and the collaborator can discuss proposed changes to the media project while simultaneously reviewing the media project. Alternatively, the collaborator can edit the media project independently, without simultaneously collaborating with another party. For example, the collaborator unilaterally can propose or make changes to the media project before transmitting an edited version of the media project to the originator for review. The originator can then access the edited portions of the media project or access the entire edited version of the media project.

The collaborator also can insert editing suggestions in the media project during simultaneous or time-separated collaboration sessions. For example, a collaborator can review and pause a media project to insert a textual note, an audio comment, or metadata suggesting changes to the media project. An edited version of the media project can be presented in the originator interface 122 and the collaborator interface 132. Further, a summary of changes to the media project can be transmitted to the originator and presented in the originator interface 122.

The installed collaborative software application can resolve editing conflicts by notifying each of the network participants of such conflicts. For example, if one or more collaborators make disparate edits to a same portion of a media project, the collaborative software application can notify the one or more collaborators of the editing conflict so as to resolve the editing conflict. Instructions for solving the editing conflict can be sent to each of the one or more collaborators as well as the originator. The originator can accept all proposed changes to a media project, reject all of the proposed changes, or selectively accept a portion of the proposed changes and reject a portion of the proposed changes. For example, if two collaborators propose changes to the same portion of the media project, the originator can select either, both, or none of the changes.

Edited and un-edited versions of a media project can be stored in a storage device, accessed by an originator and/or a collaborator, and presented in, e.g., the originator interface 122 and/or the collaborator interface 132. For example, the originator can present an edited version of a media project in the originator interface 122, however, if the originator dislikes the edited version of the media project, the originator can select an un-edited version of the media project from storage and can disregard the edited version. In some implementations, the changes between a media project and an edited media project can be emphasized such that the viewing party can readily determine the edits to the media project. The emphasized changes can be highlighted, colored, projected, outlined or otherwise enhanced.

Figure 2A:
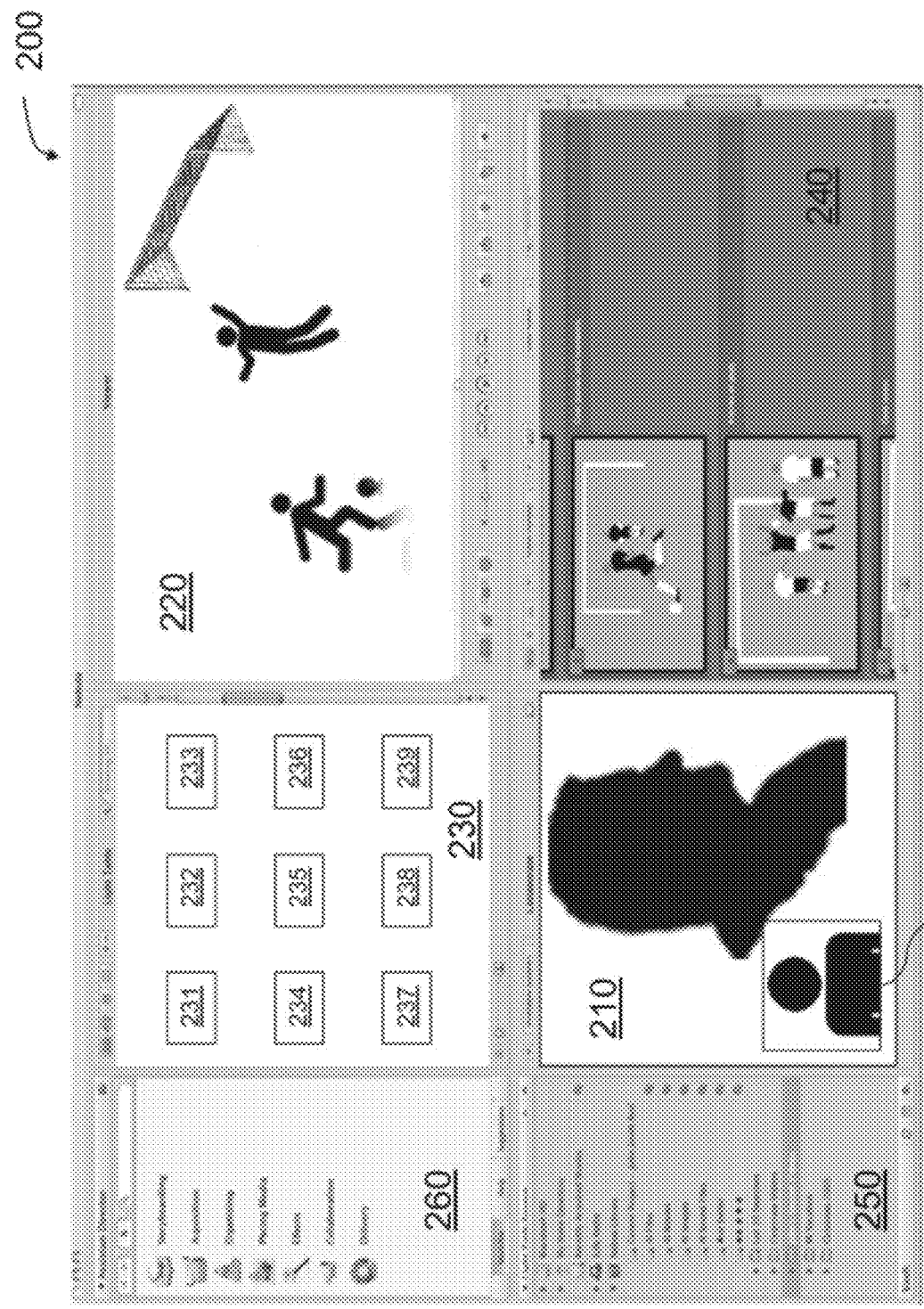

FIG. 2A shows an exemplary media collaboration originator interface 200. The originator interface 200 can be generated by the collaborative software application installed, e.g., on the originator computer 120 as shown in FIG. 1. The originator interface can be used to present, edit, manipulate, or otherwise process a media project. The originator interface 200 can include multiple media panes, such as a collaboration pane 210, a viewer pane 220, a library pane 230; and a storyboard pane 240. The multiple media panes can be configured in the originator interface 200 as shown in FIG. 2A. Further, the position of the multiple media panes in the originator interface 200 can be changed, such as by dragging-and-dropping one or more panes or by closing one or more of the panes. In some implementations, the originator interface 200 also can include panels with one or more controls that can be selected by a user, such as a project panel 250 and an overview panel 260.

The collaboration pane 210 can be used to host real-time communication between the originator and one or more collaborators. The collaborative software application can enable communication between the originator and one or more collaborator through the collaboration pane 210 via video, audio, text, or any combination thereof. In some implementations, an image of the collaborator can be presented in the collaboration pane 210. The image can be a still-frame image of the collaborator, such as a photo, an avatar representing the collaborator, or any other such image. In some other implementations, a real-time video image of the collaborator can be shown in the collaboration pane 210 via a web-camera, or other motion-image capturing and transmitting device coupled to the collaborator's computer.

Figure 2B:
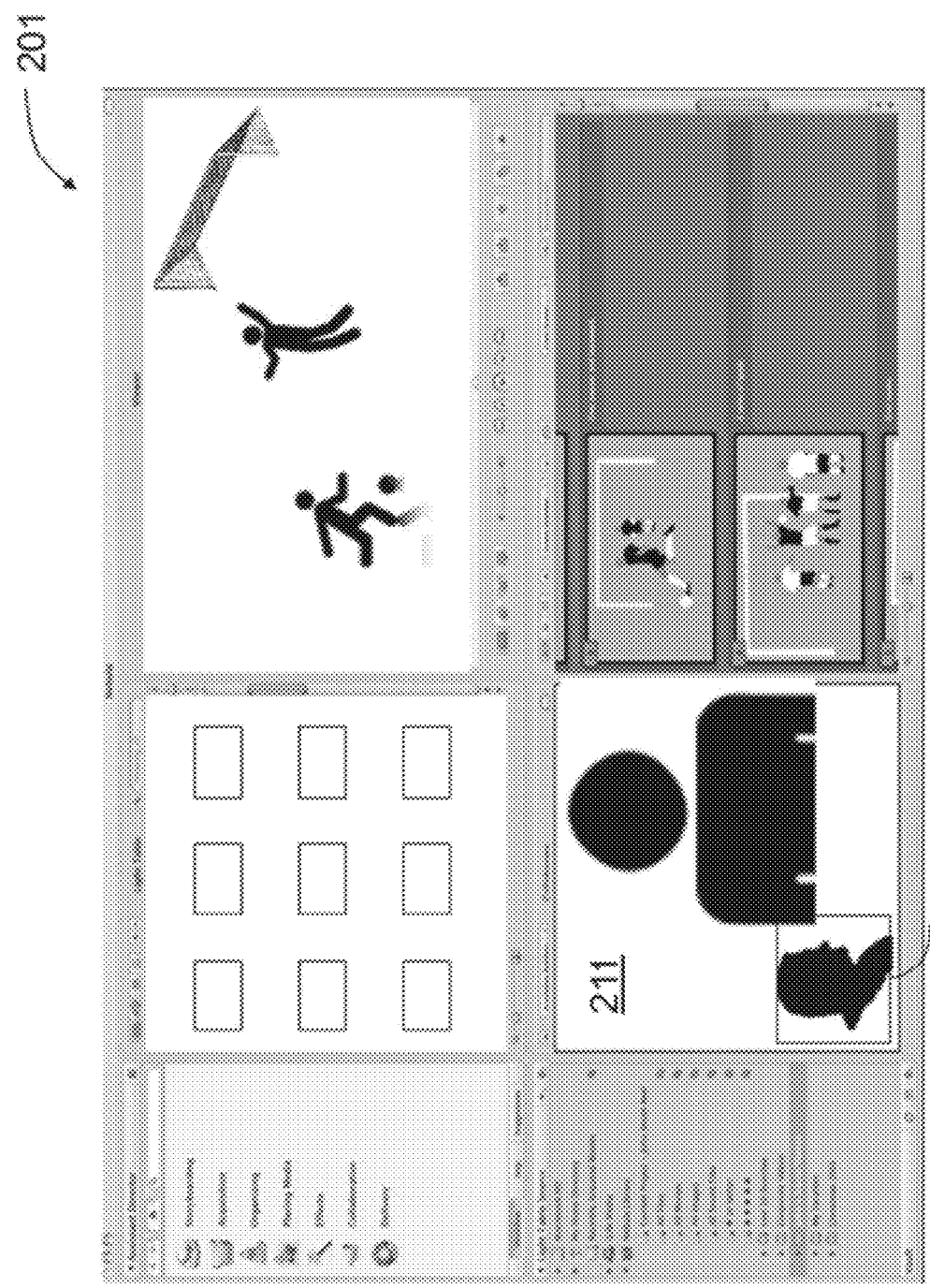

An originator window 212 also can be inset in the collaboration pane 210. The originator window 212 can present an image of the originator, such as a still-frame image, an avatar representing the originator, or any other such image. In some implementations, the originator can transmit real-time video images of the originator to the collaborator. The image of the originator can be presented in a collaboration pane 211 in the collaborator interface 201, as shown in FIG. 2B.

The originator also can present a media project in the viewer pane 220. The viewer pane 220 can be enlarged in the originator interface 200, such as through the selection of an icon, entry of size parameters, or a drag operation. For example, the viewer pane 220 can be enlarged to present the media project in the full window or display area of the originator computer. Further, the media project can be manipulated in the viewer pane 220 using one or more media playback buttons, such as play, pause, stop, rewind, and fast-forward. Other controls also can be included in the viewer pane 220, such as buttons associated with presenting, editing and manipulating the media project. Additional details about the editing features can be found in U.S. Utility application Ser. No. 11/760,713, entitled Identifiers For Digital Media, filed Jun. 8, 2007, the entire contents of which are incorporated herein by reference.

The library pane 230 also can be selectively presented in the originator interface 200. The library pane 230 can include a plurality of media clips, such as the media clips 231-239, which can selectively comprise a media project. The media project can be manipulated by re-arranging or cutting the media clips included in the library pane 230. For example, by moving the media clip 231 to the right of the media clip 232, the sequence of the media project can be rearranged to present the content of the media clip 232 before the content of the media clip 231. In some implementations, additional media clips can be included in the library pane 230. The library pane 230 also can include media clips that are not part of the media project. Additional details about the library features can be found in U.S. Utility application Ser. No. 11/760,691, entitled Assembling Video Content, filed Jun. 8, 2007, the entire contents of which are incorporated herein by reference.

The storyboard pane 240 also can be selectively presented in the originator interface 200. The storyboard pane 240 can include a sequence of sketches, screen shots, or other representations depicting the temporal sequence of the media project, including significant changes of action. The storyboard pane 240 also can include a script corresponding to the media project. Additional details about the storyboard features can be found in U.S. Utility application Ser. No. 11/780,275, entitled Script-Integrated Storyboards, filed Jul. 19, 2007, the entire contents of which are incorporated herein by reference.

In some implementations, each item of media content associated with the individual panes of the originator interface can be selectively shared with the collaborator. For example, the originator can select the media content of the storyboard pane 240 to share with the collaborator. Further, multiple items of media content associated with the media panes of the originator interface can be shared with the collaborator. For example, the originator can select the media content of the viewer pane 220, the library pane 230, and the storyboard pane 240 to share with the collaborator. The collaborative software application further can be configured to stream the selected items of media content associated with the media panes of the originator interface 200 to the collaborator. For example, in response to input selecting the viewer pane 220, the collaborative software application can stream the media project presented in the viewer pane 220 to at least one collaborator. Further, the shared item of media content can be presented in a corresponding media pane of the collaborator interface 201 as shown in FIG. 2B. For example, the media project presented in the viewer pane 220 of the originator interface 200 can be presented in a viewer pane of the collaborator interface 201.

The plurality of media clips 231-239 and the media project can be accessed from the project panel 250. Additionally, the originator can access files stored in the storage device operatively coupled to the originator computer through the project panel 250. Moreover, previous versions of the media project can be accessed through the project panel 250. For example, un-edited versions of the media project can be retrieved from the project panel 250. The originator also can select files, including media clips, stored in the project panel 250 for inclusion in media projects.

Media project production functions related to collaboration on media production can be presented in the overview panel 260. The media project production functions can include storyboarding, acquisitioning, organizing, placing media, generating effects, collaboration, and delivery. The storyboarding function can be implemented to enable the originator to review, edit, process or otherwise manipulate items of media content presented in the storyboarding pane 240. The acquisition function can be implemented to enable the originator to acquire media content comprising the media project. The organizing function can be implemented to enable the originator to organize the media content comprising the media project. The placing media function can be implemented to enable the originator to re-arrange or cut portions of the media project. The effects function can be implemented to enable the originator to include transitions, text and titles, among other effects, in the media project. The collaboration function can be implemented to enable the originator to collaborate in real-time with one or more collaborators through the originator interface collaboration pane 210. The delivery function can be implemented to enable the originator to share a portion of the media project with the collaborator.

The originator interface 200 also can include one or more collaboration panes 210. In such an implementation, real-time video images of each of the one or more collaborators can be presented in the one or more collaboration panes 210. For example, two collaborators can be presented in individual collaboration panes 210 of the originator interface 200.

FIG. 2B shows an exemplary media collaboration collaborator interface 201. The collaborator interface 201 includes multiple media panes corresponding to the multiple media panes presented in the originator interface 200 in FIG. 2A. Except for a collaboration pane 211, the items of media content presented in the originator interface 200 can be presented similarly in the collaborator interface 201. Further, the collaboration pane 211 can be configured oppositely the collaboration pane 210 of the originator interface 200, such that the image of the originator and the image of the collaborator are juxtaposed. For example, an image of a collaborator can be presented in the originator interface collaboration pane 210 and an image of an originator can be presented in the collaborator interface collaboration pane 211. Similarly, an image of the originator can be presented in the originator interface originator window 212, whereas an image of a collaborator can be presented in the collaborator interface collaborator window 213. Through the respective collaboration panes 210 and 211, the originator and the collaborator can communicate simultaneously in real-time to collaborate on a media project.

FIG. 2C shows an exemplary media collaboration limited collaborator interface 202. The limited collaborator interface 202 can be provided by, e.g., a chat application installed on a collaborator computer. The collaborator can review and provide feedback on items of media content presented in the limited collaborator interface 202, but cannot edit, process or otherwise manipulate the items of media content. The limited collaborator interface 202 can include at least one media pane in which media content associated with the media project can be presented. The limited collaborator interface 202 also can include an originator window 214, a collaborator window 216, a viewer pane 222, and a collaborator list 270.

One or more images of an originator, such as still-frame images, an avatar representing the originator, or any other such images can be presented in the originator window 214. In some implementations, the originator can transmit and the collaborator can receive real-time video images of the originator. The chat application can be configured to enable real-time video, audio, or written communication, or a combination thereof, through the originator window 214. The collaborator window 216 operates similarly to the originator window 214, except that one or more images of a collaborator can be presented.

An item of media content, or more particularly, a media project, can be presented in the viewer pane 222. The viewer pane 222 operates similarly to the viewer pane 220 of the originator interface 200, as shown in FIG. 2A, except that items of media content cannot be edited, processed or otherwise manipulated. The limited collaborator interface 202 can include one or more media playback buttons, including a volume slider which can be selectively toggled to increase a communication volume level between the originator and the collaborator, or to increase a volume level of a media project being played back.

A media project can be shared with one or more collaborators presented in the collaborator list 270. For example, a collaborator operating the limited collaborator interface 202 can share the media project with a further collaborator on the collaborator list 270. The collaborator can assign the further collaborator a privilege level no greater than the privilege level assigned to the collaborator by the originator. Thus, if the collaborator cannot edit the media project, the further collaborator cannot edit the media project either, even if the further collaborator is operating the collaborator interface 201. The originator and one or more collaborators unassociated with the media project also can be included in the collaborator list 270.

FIG. 3 shows a flowchart of an exemplary process for collaborating on a media project. The process 300 can, for example, be implemented in interfaces 200, 201 and 202 of FIGS. 2A, 2B and 2C, respectively.

Present an originator interface including multiple media panes (305). The originator interface can be generated by a collaborative software application installed, e.g., on an originator's computer system. The collaborative software application enables the originator to present, edit, process or otherwise manipulate one or more accessible media projects. The originator can be a creator of the corresponding media project.

At least one item of media content associated with a selected media project can be presented in one of the multiple media panes. The multiple media panes can include one or more of a collaboration pane, a viewer pane, a library pane, and a storyboard pane. One or more images associated with a collaborator can be presented in the collaboration pane. Additionally, one or more images associated with an originator also can be presented in the collaboration pane. For example, the collaborator can be a teacher and the originator can be a student in a media project production course. One or more media projects can be selectively presented and played in the viewer pane. Further, a plurality of media clips can be presented in the library pane, including one or more media clips comprising the media project. Moreover, the storyboard pane can include a sequence of sketches or representations depicting events in the media project, such as significant changes of action or sequence. The originator interface also can include one or more panels, such as a project panel and an overview panel. For example, one or more previous versions of the media project can be presented in the project panel. In addition, media project production functions can be presented in the overview panel.

Establish a connection with a collaborator (310). The connection is established over a communication network, such as in response to an invitation sent by the originator. The connection enables the originator and the collaborator to share one or more files and to collaborate on the media project. In some implementations, the originator can establish a connection with more than one collaborator. Further, the collaborative software application installed on the originator's computer system can be configured to establish and manage the connection between the originator and each collaborator over the communication network. The connection can be configured to enable real-time communication over the communication network.

A collaborator's computer system also can include a collaborative software application configured to enable the collaborator to present, edit, process or otherwise manipulate media projects in a collaborator interface. Similar to the originator interface, the collaborator interface can be configured to enable live video, audio and textual communications between a collaborator and an originator. Alternatively, a collaborator's computer system also can include, e.g., a chat application configured to enable the collaboration to present, review and provide feedback on a media project in a limited collaborator interface. The limited collaborator interface can be configured to enable live video, audio and textual communications between a collaborator and an originator.

Receive a selection indicating an item of media content associated with at least one of the multiple media panes (315). The item, or items, of media content can comprise the media project and can include video clips, audio clips, transitions, text, storyboard sketches, and titles. In response to an originator's input, the collaborative software application can be configured to enable the originator to select an item of media content in preparation to share the selected item of media content with a collaborator. For example, video clips as well as storyboard sketches of a media project can be selected by the originator. Moreover, the originator can select an item of media content associated with a prior version of a media project. The selected item of media content can be stored in the originator's computer system, or stored on a remote server accessible to both the originator and a collaborator.

Transmit to the collaborator the selected item of media content (320). The selected item, or items, of media content can be transmitted to the collaborator over a communication network by the collaborative software application installed on an originator's computer system. The collaborative software application can send live streaming screenshots from an originator interface to the collaborator. The collaborator can receive, present, review, play and selectively edit the item of media content in a collaborator interface. Items of media content can include one or more sketches, video clips, or scripts of the media project. In some implementations, descriptions and thumbnails representative of the items of media content can be shared with a collaborator. For example, descriptions, names and thumbnails of video clips comprising a media project can be transmitted to a collaborator as opposed to transmitting live streaming screenshots of items of media content. In such an implementation, the collaborative software application installed on the collaborator's computer system can retrieve other data indicative of the items of media content at a later time.

Additionally, a collaborator can receive, present, review and play the shared item of media content in a limited collaborator interface. In some implementations, an item of media content can be transmitted to a third party before being received by the collaborator. For example, the collaborative software application can transmit the item of media content to a media broker, which in turn can transmit the item of media content to be received by a collaborator. In such an implementation, the media broker delivery system can increase efficiency in delivering an item of media content to more than one collaborator. In other implementations, the originator can notify the collaborator through a publish/subscribe communication model that an item of media content is available to be shared. For example, the collaborator can receive a notification and can retrieve an item of media content from the originator directly, or indirectly, such as by retrieving the item of media content from a shared server.

Enable inter-user communication relating to the selected item of media content in the originator interface with the collaborator (325). An originator can communicate through a collaboration pane of an originator interface with a collaborator over a communication network regarding a media project. Such collaborative communication can include providing feedback on or proposing changes to the media project via video, audio, or written communication. Further, an originator and a collaborator can simultaneously collaborate on and/or edit, process, or otherwise manipulate a media project remotely. For example, both the originator and the collaborator can operate a redundant set of editing controls for manipulating the media project in each respective collaborative interface such that either can propose and make on the fly changes to the media project while communicating in real-time. Conversely, if a collaborator is operating a limited collaborator interface, the collaborator can merely present, review, play and propose changes to the media project.

Communication between an originator and a collaborator also can be time-separated. For example, the originator can transmit a message to be received by the collaborator when the collaborator next connects to the communication network. The originator also can communicate with multiple collaborators in an originator interface where the multiple collaborators can independently, or collectively, review, propose changes, and/or make such proposed changes to a media project.

Figure 4:
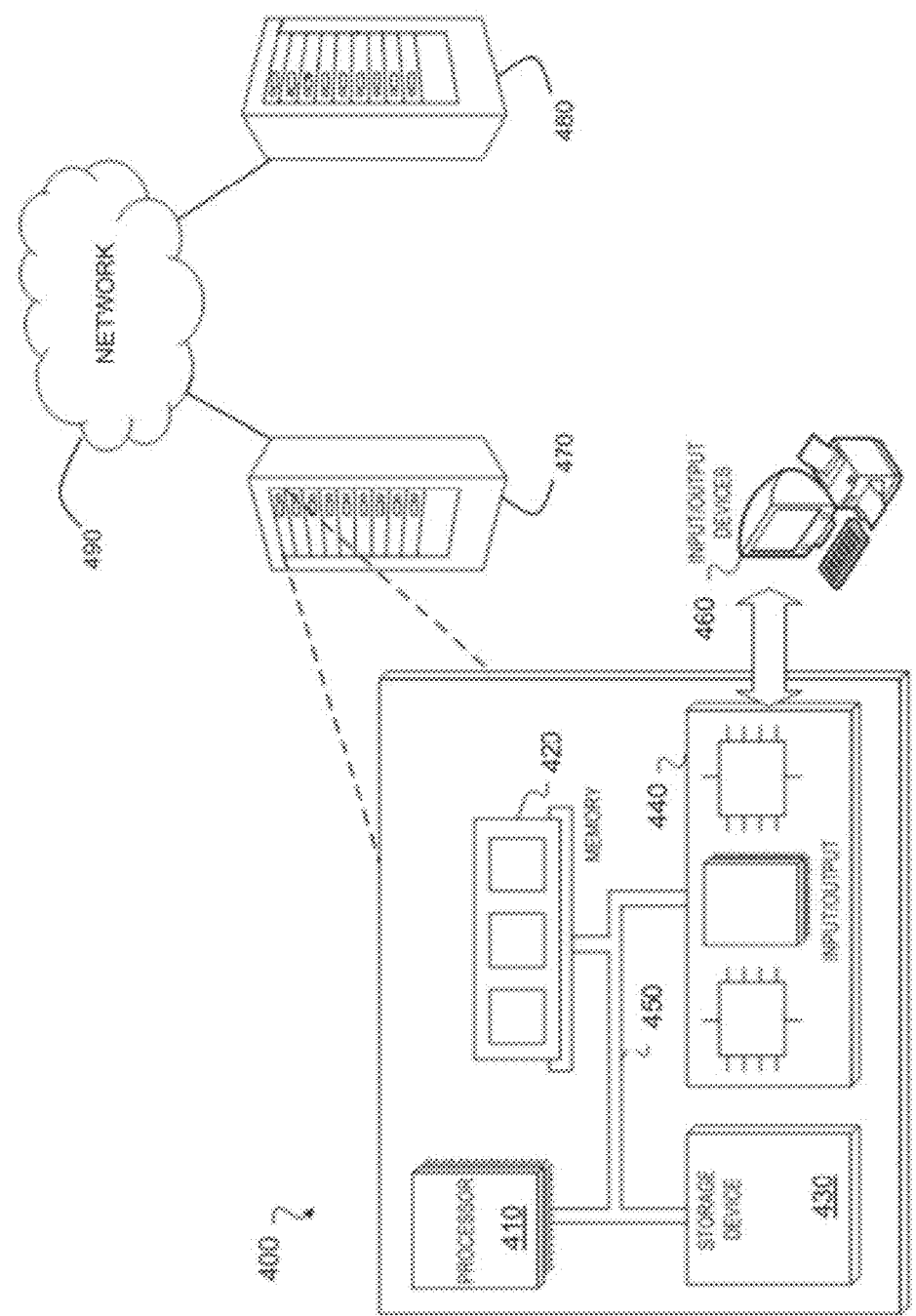
FIG. 4 is a schematic diagram of an example computer system that can be utilized to implement the systems and methods described herein.

FIG. 4 is a schematic diagram of an example computer system 400 that can be utilized to implement the systems and methods described herein. The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. The processor 410 can be a single-threaded processor or a multi-threaded processor. The processor 410 is capable of processing instructions stored in the memory 420 or on the storage device 430.

The memory 420 stores information within the system 400. The memory 420 can be volatile memory, non-volatile memory, or a combination thereof. The memory 420 in the computer system 400 also can be configured such that the storage device 430 is used to expand the physical memory.

The storage device 430 is configured to provide mass storage for the computer system 400. The storage device 430 can be implemented using a mass storage device such as a hard disk device, an optical disk device, a flash drive, or a combination thereof.

The input/output device 440 provides input/output operations for the system 400. In some implementations, the input/output device 440 can include one or more of a network interface device, e.g., an Ethernet card, a serial communication device, e.g., an RS-232 port, and/or a wireless interface device, e.g., an 802.11 card. In some implementations, the input/output device 440 also can include driver devices configured to receive input data and send output data to other input/output devices, e.g., a keyboard, a printer, and a display device 460.

The system 400 can be housed in a general purpose computing system, such as a desktop, laptop, mobile computer, or other such device. The system 400 can be directly connected to a local server 470 and also can be connected to a remote server 480 through a communication network 490. The communication network 490 can be implemented as a serial network, a local area network, a wireless network, a parallel network or other reasonable communication linking systems.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the flow diagrams depicted in the figures do not require the particular order shown, or sequential order, to achieve desirable results. In addition, other steps may be provided, or steps may be eliminated, from the described flow diagrams, and other components may be added to, or removed from, the described systems. Accordingly, various modifications may be made to the disclosed implementations and still be within the scope of the following claims.

Thus, particular implementations of the disclosure have been described. Other implementations are within the scope of the following claims. For example, the actions recited in the claims can be performed in a different order and still achieve desirable results.

What is claimed is:

1. A method comprising:
presenting, to an originator of a media project, an originator interface including multiple originator media panes using a computer system associated with the originator;
displaying, to the originator, items of media content associated with the media project using the multiple originator media panes;
establishing a connection between the computer system associated with the originator and a computer system associated with a first collaborator in the media project;
receiving, from the originator, a selection indicating a subset of the items of media content associated with a subset of the multiple originator media panes for sharing with the first collaborator; and
transmitting, to the first collaborator, information regarding the selected subset of the items of media content.

2. The method of claim 1, comprising:
presenting, to the first collaborator in the media project, a first collaborator interface including multiple first media panes using the computer system associated with the first collaborator;
receiving, from the originator, information regarding the selected subset of the items of media content;
displaying, to the first collaborator, the selected subset of the items of media content using the multiple first media panes;
receiving, from the first collaborator, a modification to the selected subset of the items of media content; and
transmitting, to the originator, information regarding the modification to the selected subset of the items of media content.

3. The method of claim 2, comprising:
receiving, at the originator, information regarding the modification to the selected subset of the items of media content; and
displaying, to the originator, modified items of media content based on the received information regarding the modification to the selected subset of the items of media content.

4. The method of claim 3, comprising:
receiving, from the originator, an input indicating an action performed by the originator regarding the modification to the selected subset of the items of media content, the action selected from the group consisting of
acceptance of the modification to the selected subset of the items of media content,
rejection of the modification to the selected subset of the items of media content,
selective acceptance of a portion of the modification to the selected subset of the items of media content, and
selective rejection of a portion of the modification to the selected subset of the items of media content.

5. The method of claim 2, wherein at least one of the originator interface and the first collaborator interface includes a graphical user interface.

6. The method of claim 2, wherein receiving a modification to the selected subset of the items of media content comprises at least one of:
receiving, from the first collaborator, an edit to an item of media content included in the selected subset of the items of media content, and
receiving, from the first collaborator, a new item of media content for inclusion in the media project.

7. The method of claim 2, comprising:
presenting, to a second collaborator in the media project, a second collaborator interface using a computer system associated with the second collaborator;
receiving, at the second collaborator, at least one of information regarding the selected subset of the items of media content from the originator, and information regarding the modification to the selected subset of the items of media content from the first collaborator; and
displaying, to the second collaborator, at least one of the selected subset of the items of media content from the originator, and the modification to the selected subset of the items of media content from the first collaborator.

8. The method of claim 7, wherein the second collaborator interface includes a limited collaborator interface associated with a communication application installed on the computer system associated with the second collaborator, the second collaborator interface configured only for displaying items of media content.

9. The method of claim 8, wherein the second collaborator interface is associated with a messaging program.

10. The method of claim 2, wherein the originator interface and the first collaborator interface are configured for playing the media project simultaneously.

11. The method of claim 1, comprising:
receiving, at a server that is connected to the computer system associated with the originator, a first message associated with the media project that is published by the originator; and
transmitting, from the server, information associated with the first message to collaborators who have subscribed to receive messages associated with the media project.

12. The method of claim 11, wherein the first message corresponds to a new version of the media project produced by the originator, and
wherein the information associated with the first message includes a notification message indicating that a new version of the media project is available.

13. The method of claim 11, comprising:
receiving, at the server, a second message associated with the media project from a collaborator indicating that a revision to the media project made by the collaborator is available; and
transmitting, from the server, a notification message including information on the revision to the media project made by the collaborator, the notification message sent to the collaborators and the originator.

14. A system comprising:
a first processor; and
first instructions stored in a non-transitory computer-readable first medium for execution by the first processor and configured to cause the first processor to perform operations comprising:
presenting, to an originator of a media project, an originator interface including multiple originator media panes using a computer system associated with the originator;
displaying, to the originator, items of media content associated with the media project using the multiple originator media panes;
establishing a connection between the computer system associated with the originator and a computer system associated with a first collaborator in the media project;
receiving, from the originator, a selection indicating a subset of the items of media content associated with a subset of the multiple originator media panes for sharing with the first collaborator; and transmitting, to the first collaborator, information regarding the selected subset of the items of media content.

15. The system of claim 14, comprising:
a second processor; and
second instructions stored in a non-transitory computer-readable second medium for execution by the second processor and configured to cause the second processor to perform operations comprising:
presenting, to the first collaborator in the media project, a first collaborator interface including multiple first media panes using the computer system associated with the first collaborator;
receiving, from the originator, information regarding the selected subset of the items of media content;
displaying, to the first collaborator, the selected subset of the items of media content using the multiple first media panes;
receiving, from the first collaborator, a modification to the selected subset of the items of media content; and
transmitting, to the originator, information regarding the modification to the selected subset of the items of media content.

16. The system of claim 15, wherein the first instructions are configured to cause the first processor to perform operations further comprising:
receiving, at the originator, information regarding the modification to the selected subset of the items of media content; and
displaying, to the originator, modified items of media content based on the received information regarding the modification to the selected subset of the items of media content.

17. The system of claim 16, wherein the first instructions are configured to cause the first processor to perform operations further comprising:
receiving, from the originator, an input indicating an action performed by the originator regarding the modification to the selected subset of the items of media content, the action selected from the group consisting of
acceptance of the modification to the selected subset of the items of media content,
rejection of the modification to the selected subset of the items of media content,
selective acceptance of a portion of the modification to the selected subset of the items of media content, and
selective rejection of a portion of the modification to the selected subset of the items of media content.

18. The system of claim 15, wherein at least one of the originator interface and the first collaborator interface includes a graphical user interface.

19. The system of claim 15, wherein the second instructions that are configured to cause the second processor to perform operations comprising receiving a modification to the selected subset of the items of media content comprises second instructions that are configured to cause the second processor to perform operations comprising at least one of:
receiving, from the first collaborator, an edit to an item of media content included in the selected subset of the items of media content, and
receiving, from the first collaborator, a new item of media content for inclusion in the media project.

20. The system of claim 15, comprising:
a third processor; and
third instructions stored in a non-transitory computer-readable third medium for execution by the third processor and configured to cause the third processor to perform operations comprising:
presenting, to a second collaborator in the media project, a second collaborator interface using a computer system associated with the second collaborator;
receiving, at the second collaborator, at least one of information regarding the selected subset of the items of media content from the originator, and information regarding the modification to the selected subset of the items of media content from the first collaborator; and
displaying, to the second collaborator, at least one of the selected subset of the items of media content from the originator, and the modification to the selected subset of the items of media content from the first collaborator.

21. The system of claim 20, wherein the second collaborator interface includes a limited collaborator interface associated with a communication application installed on the computer system associated with the second collaborator, the second collaborator interface configured only for displaying items of media content.

22. The system of claim 21, wherein the second collaborator interface is associated with a messaging program.

23. The system of claim 15, wherein the originator interface and the first collaborator interface are configured for playing the media project simultaneously.

24. The system of claim 14, comprising:
a fourth processor; and
fourth instructions stored in a non-transitory computer-readable fourth medium for execution by the fourth processor and configured to cause the fourth processor to perform operations comprising:
receiving, at a server that is connected to the computer system associated with the originator, a first message associated with the media project that is published by the originator; and
transmitting, from the server, information associated with the first message to collaborators who have subscribed to receive messages associated with the media project.

25. The system of claim 24, wherein the first message corresponds to a new version of the media project produced by the originator, and
wherein the information associated with the first message includes a notification message indicating that a new version of the media project is available.

26. The system of claim 24, wherein the fourth instructions are configured to cause the fourth processor to perform operations comprising:
receiving, at the server, a second message associated with the media project from a collaborator indicating that a revision to the media project made by the collaborator is available; and
transmitting, from the server, a notification message including information on the revision to the media project made by the collaborator, the notification message sent to the collaborators and the originator.

27. A computer program product that is encoded on a non-transitory computer-readable storage medium and including instructions configured to cause a data processing apparatus to perform operations comprising:

presenting, to an originator of a media project, an originator interface including multiple originator media panes using a computer system associated with the originator;

displaying, to the originator, items of media content associated with the media project using the multiple originator media panes;

establishing a connection between the computer system associated with the originator and a computer system associated with a first collaborator in the media project;

receiving, from the originator, a selection indicating a subset of the items of media content associated with a subset of the multiple originator media panes for sharing with the first collaborator; and transmitting, to the first collaborator, information regarding the selected subset of the items of media content.

28. The computer program product of claim 27, wherein the instructions are configured to cause the data processing apparatus to perform operations comprising:

presenting, to the first collaborator in the media project, a first collaborator interface including multiple first media panes using the computer system associated with the first collaborator;

receiving, from the originator, information regarding the selected subset of the items of media content;

displaying, to the first collaborator, the selected subset of the items of media content using the multiple first media panes;

receiving, from the first collaborator, a modification to the selected subset of the items of media content; and transmitting, to the originator, information regarding the modification to the selected subset of the items of media content.

29. The computer program product of claim 28, wherein the instructions are configured to cause the data processing apparatus to perform operations comprising:

receiving, at the originator, information regarding the modification to the selected subset of the items of media content; and displaying, to the originator, modified items of media content based on the received information regarding the modification to the selected subset of the items of media content.

30. The computer program product of claim 29, wherein the instructions are configured to cause the data processing apparatus to perform operations comprising:

receiving, from the originator, an input indicating an action performed by the originator regarding the modification to the selected subset of the items of media content, the action selected from the group consisting of acceptance of the modification to the selected subset of the items of media content, rejection of the modification to the selected subset of the items of media content, selective acceptance of a portion of the modification to the selected subset of the items of media content, and selective rejection of a portion of the modification to the selected subset of the items of media content.

31. The computer program product of claim 28, wherein at least one of the originator interface and the first collaborator interface includes a graphical user interface.

32. The computer program product of claim 28, the instructions that are configured to cause the data processing apparatus to perform operations comprising receiving a modification to the selected subset of the items of media content comprises second instructions that are configured to cause the data processing apparatus to perform operations comprising at least one of:

receiving, from the first collaborator, an edit to an item of media content included in the selected subset of the items of media content, and receiving, from the first collaborator, a new item of media content for inclusion in the media project.

33. The computer program product of claim 28, wherein the instructions are configured to cause the data processing apparatus to perform operations comprising:

presenting, to a second collaborator in the media project, a second collaborator interface using a computer system associated with the second collaborator;

receiving, at the second collaborator, at least one of information regarding the selected subset of the items of media content from the originator, and information regarding the modification to the selected subset of the items of media content from the first collaborator; and displaying, to the second collaborator, at least one of the selected subset of the items of media content from the originator, and the modification to the selected subset of the items of media content from the first collaborator.

34. The computer program product of claim 33, wherein the second collaborator interface includes a limited collaborator interface associated with a communication application installed on the computer system associated with the second collaborator, the second collaborator interface configured only for displaying items of media content.

35. The computer program product of claim 34, wherein the second collaborator interface is associated with a messaging program.

36. The computer program product of claim 28, wherein the originator interface and the first collaborator interface are configured for playing the media project simultaneously.

37. The computer program product of claim 27, wherein the instructions are configured to cause the data processing apparatus to perform operations comprising:

receiving, at a server that is connected to the computer system associated with the originator, a first message associated with the media project that is published by the originator; and transmitting, from the server, information associated with the first message to collaborators who have subscribed to receive messages associated with the media project.

38. The computer program product of claim 37, wherein the first message corresponds to a new version of the media project produced by the originator, and wherein the information associated with the first message includes a notification message indicating that a new version of the media project is available.

39. The computer program product of claim 37, wherein the instructions are configured to cause the data processing apparatus to perform operations comprising:

receiving, at the server, a second message associated with the media project from a collaborator indicating that a revision to the media project made by the collaborator is available; and transmitting, from the server, a notification message including information on the revision to the media project made by the collaborator, the notification message sent to the collaborators and the originator.

* * * * *

UNITED STATES PATENT AND TRADEMARK OFFICE
CERTIFICATE OF CORRECTION

| | | |
|---|---|---|
| PATENT NO. | : 8,490,012 B2 | Page 1 of 1 |
| APPLICATION NO. | : 13/549664 | |
| DATED | : July 16, 2013 | |
| INVENTOR(S) | : Marinkovich et al. | |

It is certified that error appears in the above-identified patent and that said Letters Patent is hereby corrected as shown below:

On the title page, in column 2, under "Other Publications", line 3-4, delete "U.S. Non-Final Office Action for U.S. Appl. No. 12/171,152 dated Sep. 2, 2011, 17 pages." and insert --"U.S. Appl. No. 12/171,152, Non Final Office Action mailed Sep. 2, 2011", 17 pgs.--, therefor On the title page, in column 2, under "Other Publications", line 5-6, delete "U.S. Notice of Allowance for U.S. Appl. No. 12/171,152 dated Sep. 2, 2011, 7 pages." and insert --U.S. Appl. No. 12/171,152, Notice of Allowance mailed Sep. 2, 2011, 7 pgs.--, therefor

Claims

In column 15, line 47, in Claim 4, after "of", insert --:--, therefor

In column 17, line 44, in Claim 17, after "of", insert --:--, therefor

In column 19, line 51, in Claim 30, after "of", insert --:--, therefor

Signed and Sealed this
Twenty-seventh Day of October, 2015

Michelle K. Lee
*Director of the United States Patent and Trademark Office*